Patented May 12, 1942

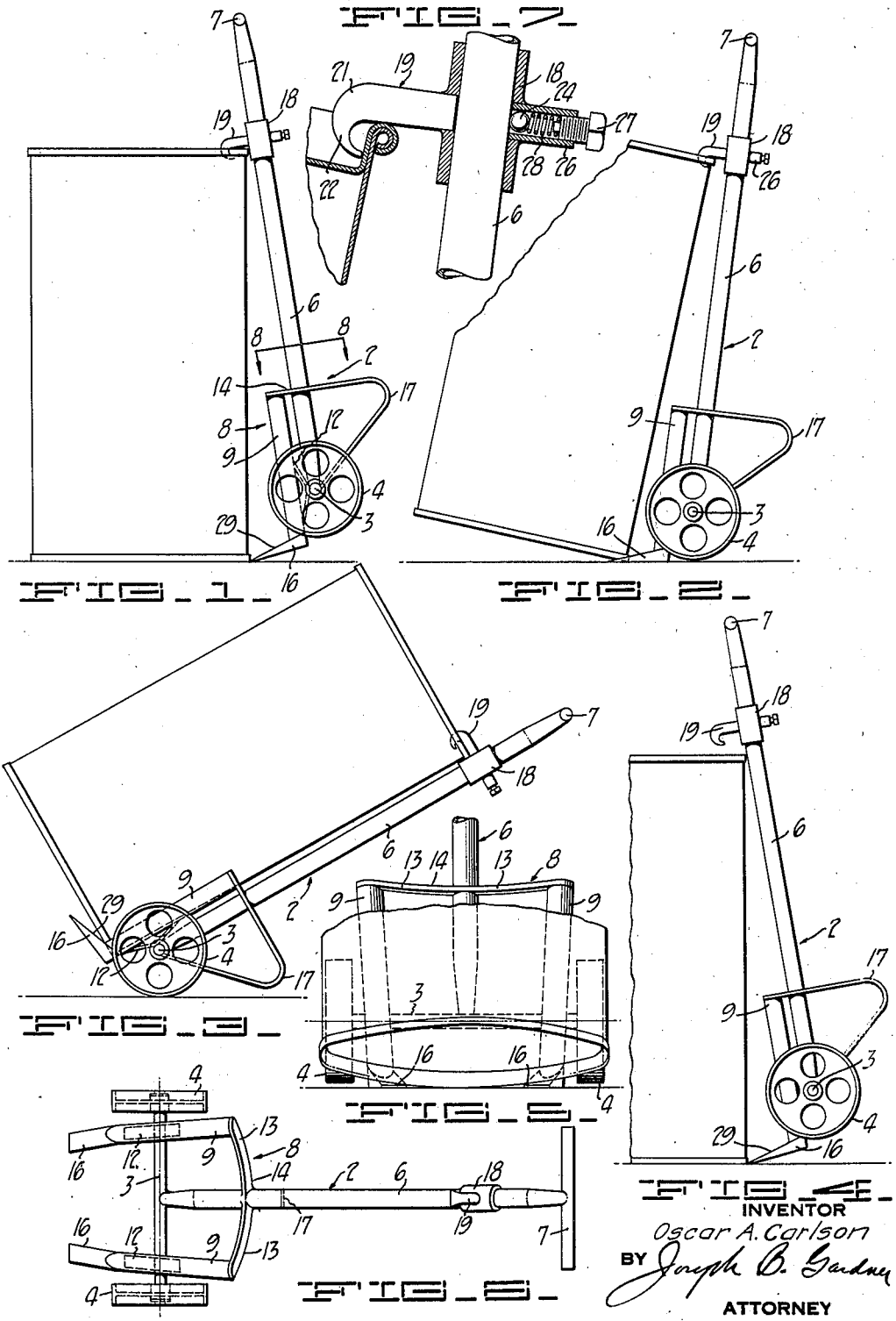
May 12, 1942. O. A. CARLSON 2,282,935
HAND TRUCK
Filed April 24, 1940 2 Sheets-Sheet 1
INVENTOR
Oscar A. Carlson
BY Joseph B. Gardner
ATTORNEY

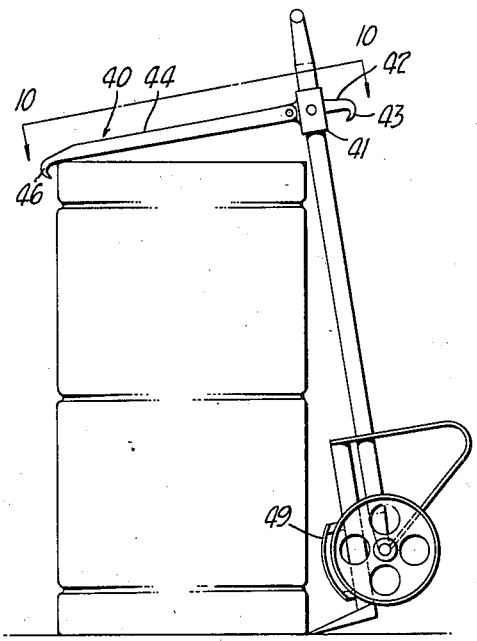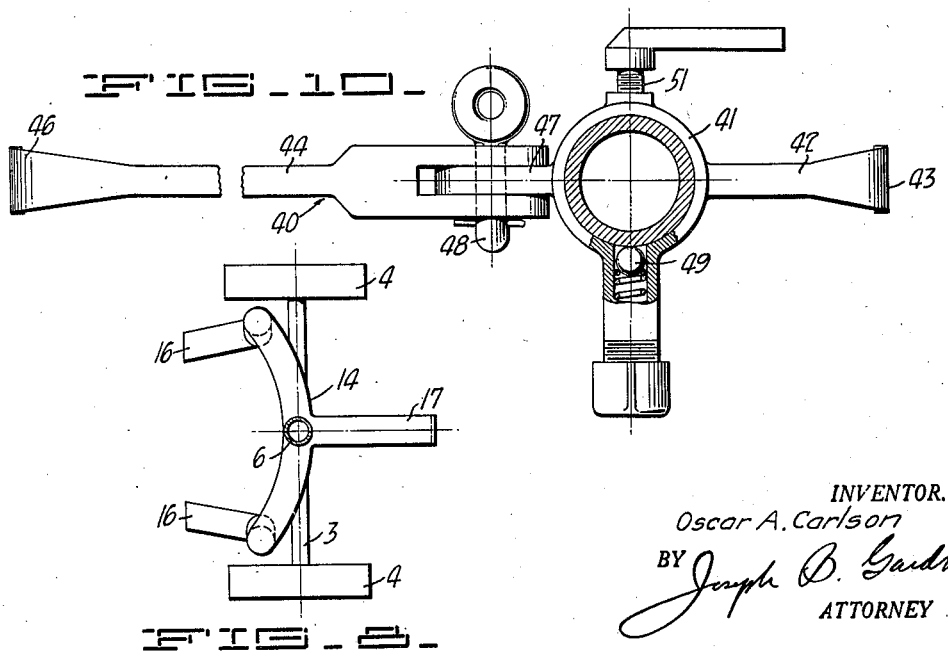

2,282,935

UNITED STATES PATENT OFFICE 2,282,935

HAND TRUCK

Oscar A. Carlson, Oakland, Calif.

Application April 24, 1940, Serial No. 331,331

4 Claims. (Cl. 214—65.4)

The invention relates to a hand truck such as used for transporting a barrel, drum, or material assembled in a bale.

An object of the invention is to provide a truck of the character described which will facilitate the loading and unloading of the articles upon and from the truck, and at the same time insure the proper retention of the articles on the truck when loaded thereon.

Another object of the invention is to provide a truck with the aforesaid features, in which the means for holding the article on the truck can be changed in position or adjusted so as to accommodate not only articles of different size but to grip and engage the articles in a manner most effective for the particular type of article.

A further object of the invention is to provide a truck of the character described in which all of the structural members are practically associated as integral parts.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figures 1 to 4 inclusive are side elevations of the truck of my invention showing same in successive positions during the loading of an article on and the unloading of an article from the truck.

Figure 5 is a front view of the lower portion of the truck and supported article in the position shown in Figure 2.

Figure 6 is a plan view of the truck as shown in Figure 3.

Figure 7 is an enlarged sectional fragmentary view of the portion as shown in Figure 2 for engaging the top of the article.

Figure 8 is a sectional view of the truck taken on the line 8—8 of Figure 1.

Figure 9 is a side view of the truck with parts modified to handle an article such as a bale.

Figure 10 is an enlarged detailed sectional view of the truck as taken on the line 10—10 of Figure 9.

As shown in Figures 1 to 8 inclusive, the truck of my invention comprises a body or frame 2 which is mounted adjacent its lower end upon an axle 3 having wheels 4 at the opposite ends.

The frame includes a central longitudinal member 6, one end of which extends to and is welded on the axle 3 while the other end is provided with a handle 7.

Provided as a part of the frame is what may be termed a cradle 8 designed for supporting the lower portion of the article to be carried, and which as here shown includes a pair of side rails 9 positioned at opposite sides of the member 6 and overlying the axle 3. The rails 9 like the member 6 are preferably formed of steel pipe, and as will be clear from Figure 1, such rails are fixed to the axle by means of spacers 12 which are welded to both the rails and the axle. Portions of the rails extend beyond each side of the axle, and the upper ends of the rails are secured to the center member 6 by arm portions 13 which combine to provide a cross bar 14. The rails are offset from the member 6, that is they are in a more elevated position on the frame so that a cylindrical article such as a barrel or drum may be supported thereon without contacting the center member.

At the lower extremity of the rails are provided toe portions 16 which are designed to engage under the bottom of the article to be supported on the truck, and in order to more firmly support and engage the sides of the article and particularly when the latter is a barrel, the rails converge from the upper to the toe ends as clearly indicated in Figure 5. A leg 17 is provided on the underside of the frame, such leg being in the form of a bent strip fixed at one end to the center member 6 where the cross bar 14 is joined thereto, and at the other end to the axle at the point of connection with the lower end of said member.

Mounted on the member 6 is a sleeve 18 which has projecting from one side thereof a means 19 designed for engaging the top of the article to be supported on the truck. The means 19 is especially designed for engaging and grasping the top of a drum or barrel and comprises an arm 21 and a hook 22 extending downwardly from the arm. As will be seen in Figure 7, in engaging the drum the arm portion 21 is designed to rest upon the upper rim or chime of the drum, so that the hook portion 22 will be inserted within such rim. In this manner when a drum or barrel is positioned against the frame of the truck, the hook may be engaged with the chime so as to secure the drum or barrel to the truck. In order to hold the sleeve frictionally engaged with the member 6 and at the same time permit of its being readily moved longitudinally thereon when required, a spring pressed ball 24 is mounted in a tubular extension 26 of the sleeve and arranged to engage the surface of the member. The pressure of the ball against the member may be varied by means of an adjusting screw 27 which engages the spring 28 back of the ball.

It is important to note that the surface 29 of the toes upon which the bottom of the drum or barrel is arranged to be supported, is inclined so as to define an obtuse angle between such surfaces and the longitudinal axis of the frame. The pitch or inclination of such surfaces and the length thereof is such, that the longitudinal displacement to which the barrel or drum is subjected when the bottom thereof is moved over the toes from one end to the other, is greater than the amount of penetration permitted the hook within the rim or chime of the drum. In other words, the length of the hook portion 22 below the arm portion 21 is less than the longitudinal displacement caused the barrel in movement transversely of the truck frame while engaged with the toes and moving the length thereof. It is this difference in the relations aforesaid that in a large measure contributes to the effective loading and unloading operation permitted with the truck of my invention. In Figures 1 to 4 inclusive, I have illustrated the consecutive steps in the loading and unloading operations. In the initial loading operation, which is illustrated in Figure 1, the truck is tilted upon its lower edge, that is the toes 16, and positioned against the side of the drum, the engaging means 19 having been previously elevated by the operator so as to lie above the top of the drum. With the truck so positioned, the means 19 is moved by the operator downwardly on the member 6 until the arm portion 21 rests upon the portion of the upper edge of the rim or chime of the drum adjacent the truck, and the hook portion 22 is positioned at the back thereof. By then tilting the truck backwardly, as shown in Figure 2, the drum will be correspondingly tipped on end whereby a space will be created between the ground surface and the bottom of the drum into which the toe portions will enter so that upon the continued backward and downward tilting of the drum, as shown in Figure 3, the bottom of the drum will slide down upon the inclined surfaces 29 of the toes until the drum is properly supported in the cradle. As will be evident, as the bottom of the drum moves over the surfaces 29 and the drum is thereby moved upward in the cradle, the drum engaging means 19 is forced upwardly by the drum along the member 6, the movement of such means however being afforded without releasing the connection with the drum. With the drum thus firmly seated in the cradle and securely held to the frame, the truck can be easily and rapidly moved about over rough and uneven surfaces without danger of the drum becoming accidentally released and dislodged from the truck. When it is required to unload the truck and deposit the drum on end, it is merely necessary to raise the truck to upright position again, and then with the truck pressed against the side of the drum at its upper edge, the handle of the truck is sharply forced over the top of the drum until the toe portions become retracted from under the bottom of the drum. With the toes withdrawn, the drum as shown in Figure 4 is lowered to the ground, and since the engaging means 19 remains in position and the hook portion is shorter than the vertical distance the drum had descended when released from the toes, the connection between said means and the top of the drum is broken and the drum is thus completely detached from the truck.

In Figures 9 and 10 I have shown a modified form of the truck. In this embodiment the means for attaching the article to be transported is of such a form as to be particularly applicable for handling baled goods as well as drums and the like. The said means in this case is provided with two different article engaging arms, and the means may be reversed in position on the truck so as to afford use of either form of arm. As illustrated in the drawings, such means 40 is formed with a sleeve 41 on which is provided arm and hook portions 42 and 43 corresponding to and arranged to be used in the same manner as the arm and hook portions 21 and 22. Likewise extending from the sleeve, but at the opposite side thereof, is an arm 44 having a hook portion 46 formed on the outer end thereof. The arm 44 is pivotally connected to ear 47 on the sleeve so as to be swung about a horizontal axis, the pivot being preferably in the form of a pin 48. It will be seen that the arm 44 is considerably longer than the arm 42, and the reason therefor is that the hook 46 is designed to engage the far side of the article in effecting the attachment of the article to the truck. This is desirable in the handling of baled goods, since it is mostly impractical and always undesirable to cause the hook to penetrate the material. The pivotal connection of the arm makes quite simple the attachment to the hook to the bale without in many instances requiring any adjustment of the sleeve, and at the same time permits of the arm being lowered and positioned against the central member when not in use or particularly when the arm 42 is being used. If desired, the arm 45 may be entirely removed by withdrawing the pin 48. In this embodiment, due to the extra weight of the arm 45, there is used beside the spring pressed ball 49, a set-screw 51. Also in order to avoid contact of the bale with the truck wheels, guards 49 are provided over the latter and secured to the rails.

I claim:

1. A truck for handling barrels and the like, comprising an axle with wheels thereon, a body carried by said axle and including a longitudinal member, a barrel engaging means slidably and frictionally mounted on said member and including a portion arranged for insertion within the chime at the top of the barrel and a portion to limit the extent of such insertion, and a barrel cradle having barrel supporting portions and transversely spaced toes with inclined upper surfaces arranged for engaging the bottom edge of the barrel, the length and pitch of said toe surfaces being such that when the barrel is moved transversely thereupon the barrel will move longitudinally a distance exceeding the amount which said barrel engaging means may be inserted within the barrel chime.

2. A truck for handling barrels and the like, comprising an axle with wheels thereon, a central longitudinal member having a handle at one end and fixed to said handle at the other end, a cradle for supporting a barrel or the like including a pair of rails at opposite sides of and in offset relation to said member and having portions extending beyond said axle, a bowed cross member having arms connecting said central member with said rails, said rails converging from the end secured to said arms to the free end and secured to said axle adjacent such free end, angular toe portions extending from the free ends of said rails arranged for engaging the lower edge of the barrel when the barrel is moved into or out of said cradle and being inclined to the longitudinal axis of the truck whereby on such movement the barrel will be shifted longitudinally on the truck, a sleeve mounted about said central member between said handle and axle, an arm extending transversely from said sleeve arranged to engage the top of the chime ring at the upper end of the barrel, a hook portion extending from said arm longitudinally of the sleeve axis and in the direction of said toe portions and being of a length less than the amount of longitudinal displacement afforded the barrel by movement over said toe portions, and a spring member carried by said sleeve and engaged with said central member to frictionally hold said sleeve against displacement.

3. In a truck of the character described, an axle with wheels thereon, a body supported on said axle including a support for a barrel or a bale and having at the bottom thereof angularly disposed toe portions arranged to engage under the barrel or bale, a longitudinal member, means slidable lengthwise on said first member arranged for engaging the upper portion of a barrel or bale and including arms of varying length designed to overlie at least a portion of the top of the barrel or bale and having hook portions for engaging a portion of the barrel or bale, said arms being positionable to extend outwardly or inwardly from said first member, one of said arms having a pivotal connection, and means to fix said arms in desired position.

4. A hand truck for handling barrels and the like comprising, an axle with wheels thereon, a body carried by said axle for support of said barrel and providing a handle at the upper end thereof and including a longitudinal member, a slidable member mounted on said longitudinal member and having a depending hook for engaging within and upon the chime of the barrel at the top thereof and being designed so that engagement or disengagement with the chime may be effected by longitudinal movement of the barrel, and toe portions projecting laterally from the lower end of said body and adapted to engage under said barrel for supporting the latter, said toe portions being inclined to the longitudinal axis of the truck whereby upon movement of the barrel thereover the barrel will be shifted longitudinally on said body by a distance greater than the depth of said hook portion.

OSCAR A. CARLSON.